United States Patent [19]

Smith

[11] 4,351,015

[45] Sep. 21, 1982

[54] SHORTING CAGE FOR PROTECTOR WELLS

[75] Inventor: Thomas J. Smith, Bay Shore, N.Y.

[73] Assignee: TII Industries, Inc., Copaigue, N.Y.

[21] Appl. No.: 303,835

[22] Filed: Sep. 21, 1981

[51] Int. Cl.$^3$ .................... H02H 1/04

[52] U.S. Cl. .................... 361/119; 361/124

[58] Field of Search .................... 361/119, 120, 124, 117, 361/126; 337/32

[56] References Cited

U.S. PATENT DOCUMENTS

| | | | |
|---|---|---|---|
| Re. 29,391 | 9/1977 | Kawiecki | 361/120 X |
| 3,703,665 | 11/1972 | Yereance et al. | 361/126 |
| 4,002,952 | 1/1977 | Menninga | 361/124 |
| 4,128,855 | 12/1978 | Gilberts | 361/124 X |
| 4,159,500 | 6/1979 | Baumbach et al. | 361/124 X |

*Primary Examiner*—Reinhard J. Eisenzopf
*Attorney, Agent, or Firm*—Martin Sachs

[57] ABSTRACT

A shorting cage is provided in a telephone terminal housing having a protector well so that when the protector device is removed from its cooperating well the shorting mechanism in the form of a cage will cause the line to remain shorted until a replacement protector is reinserted into the terminal well.

9 Claims, 5 Drawing Figures

SHORTING CAGE FOR PROTECTOR WELLS

BACKGROUND OF THE INVENTION

1. Field of the Invention

The present invention relates to electrical overvoltage protectors, sometimes referred to as electrical surge protectors or lightning arresters, used to protect telephone transmission lines against voltage surges, and more particularly, relates to a shorting cage inserted in the arrester housing that permits a fail-safe short to occur upon removal of the overvoltage protector cartridge.

2. Description of the Relevant Art

Surge arresters or protective devices known in the prior art generally include a housing that contains a pair of spaced apart electrodes and a means for maintaining a protector cartridge between the electrodes. The protector cartridge may contain a pair of spaced apart carbon or a gas tube that define an arc or a discharge gap therebetween in order to ground excessive line voltages so as to protect both the equipment on the line and the line itself. With repeated overvoltage conditions and discharges, the carbon gap loses its effectiveness and a gas tube may also fail with continued use. Typical of these arresters, which may include fusing links and internal shorting mechanisms so that when an overvoltage occurs the fusing link melts permitting a short to occur from the line electrode to ground, are U.S. Pat. Nos. 4,128,855 issued to Gilberts on Dec. 5, 1978; Re. 29,391 issued to Kawiecki on Sept. 6, 1977; 4,002,952 issued to Menninga on Jan. 11, 1977; and 3,703,665 to Yereance, et al on Nov. 21, 1972.

All of these devices operate similarly, however, each device has a common shortcoming. Upon removal of the protector device the line remains open, thereby, providing no protection for the line or equipment attached thereto. All of the disclosed devices require that the protector be in position and in operating condition in order to afford the proper protection.

It is well known that when a serviceman dispatched to repair a shorted protector device, upon occasion, not having a replacement device available will return the protector cartridge without inserting the protector device therein. This condition may cause considerable damage should an overvoltage occur on the line because there is no indication that the protective mechanism is missing. The terminal or line when checked from the telephone line central office will read "open" and will indicate that the line is in good working order.

Therefore, it is an object of the present invention to provide a simple, inexpensive means for protecting telephone or other communication lines from overvoltage surges when the protector mechanism is removed therefrom.

It is yet another object of the present invention to provide a short from line-to-ground when the protective device is removed from its receptacle in a terminal block.

It is a further object of the present invention to provide a means for the central office to determine that the protective cartridge and/or protector device has been removed from a terminal protector block until a new cartridge and protector device has been replaced therein.

It is yet another object of the present invention to prevent a serviceman from replacing a defective protector cartridge without inserting a replacement protector device therein.

SUMMARY OF THE INVENTION

An overvoltage surge arrester apparatus, according to the principles of the present invention, for protecting communication lines and equipment connected thereto from voltage surges comprises a housing of insulating material having at least one well-type aperture disposed therein. The well-type aperture is provided with a first electrode disposed at the closed end thereof having an upwardly extending portion and is adapted to be connected to earth ground. A second electrode is disposed about the periphery of the open end of the well-type aperture and is adapted to be connected to one of the communication lines. A hollow electrically conductive shorting cage is adapted to be received into the well-type aperture. The shorting cage is in continuous intimate electrical contact with the second electrode and has at least one inwardly extending finger portion adapted to be electrically conductive contact with the upwardly extending portion of the first electrode. A protector cartridge including an electrically conductive shell is adapted to be received into the hollow shorting cage and is in electrically conductive contact at the upper portion thereof providing electrically conductive contact with a protective device disposed within the shell. One terminal of the protective device extends downwardly beyond the shell and is adapted to be in electrical contact with the upwardly portion of the first electrode when in position in the shorting cage. The protector cartridge shell displaces the inwardly extending finger portion of the shorting cage causing it to be out of electrical contact with the upwardly extending portion of the first electrode when placed in position in the aperture.

The foregoing and other objects and advantages will appear from the description to follow. In the description reference is made to the accompanying drawing which forms a part hereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
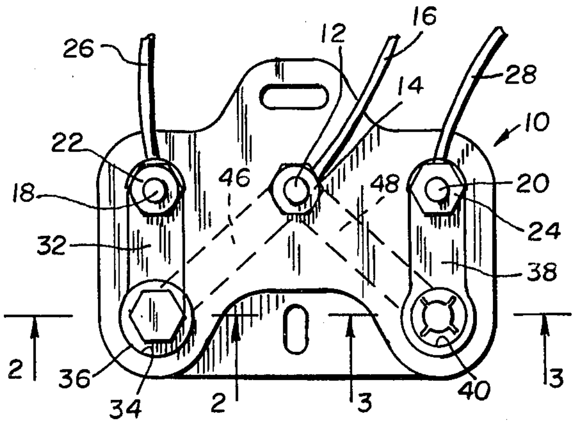
FIG. 1 is a top plan view showing a typical telephone installation for a pair of drop lines wherein each line is protected by the overvoltage arrester device and shorting cage, according to the principles of the present invention.

Referring now to the figures, and in particular, to FIG. 1, there is shown a typical telephone terminal block 10 which includes a threaded ground terminal 12 and a nut and conventional prong and flat washers 14 to which a ground wire 16 is affixed Two additional threaded terminals 18 and 20 are provided. They have affixed thereon, in a similar manner, nuts 22 and 24 and their associated flat washers to which communication lines 26 and 28, respectively, are connected, in a conventional manner. Terminals 12, 18 and 20 are affixed, in a conventional manner, in a dielectric housing or insulating block 30 which may be fabricated from any number of well known materials.

The protector terminal block or housing 10 is provided with an electrically conductive link 32 which extends from terminal 18 to a well-like aperture 34 provided in the block 10. The link 32 extends about the periphery 36 of aperture 34 and extends downwardly into the aperture 34 forming a continuous electrically conductive path from the upper portion of the well-type aperture to the line terminal 18. Aperture 34 is, preferably, threaded beyond the depth of the conductive link 32. In a similar manner a conductive link 38 is provided between terminal 20 and aperture 40 which is also threaded below the depth of the link 38.

Figure 3:
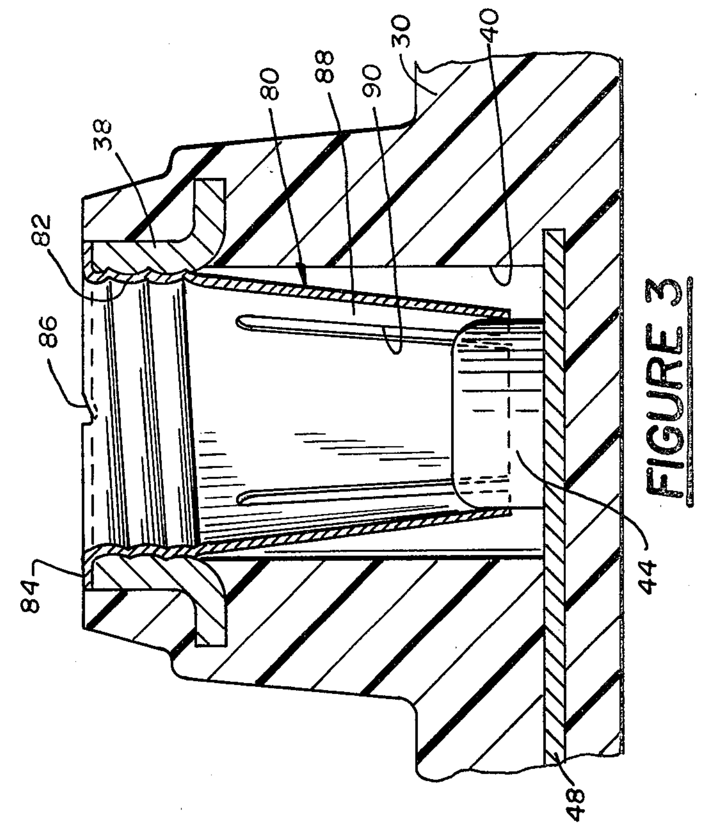
FIG. 3 is a cross-sectional view in elevation along the line 3—3 of FIG. 1 showing the position of a shorting cage with the protector removed from the well-type aperture.
Figure 2:
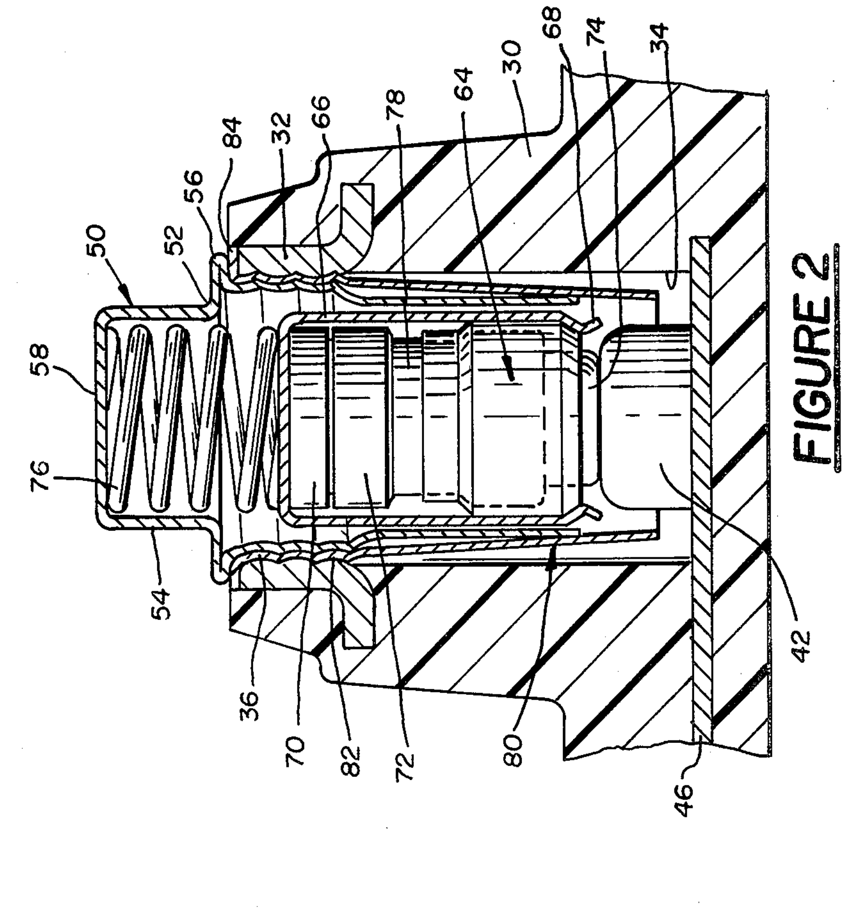
FIG. 2 is a cross-sectional view in elevation along the line 2—2 of FIG. 1 showing a protector cartridge and a shorting cage in position in the well-type aperture provided in the terminal housing of FIG. 1.

Centrally disposed in apertures 34 and 40, as is clearly shown in FIGS. 2 and 3, is an upwardly extending, electrically conductive button or protrusion 42 and 44 which is affixed, in a conventional manner, to an electrical conductor 46 and 48 (which may be combined in one piece) to provide electrical contact to the ground terminal 12.

Figure 5:
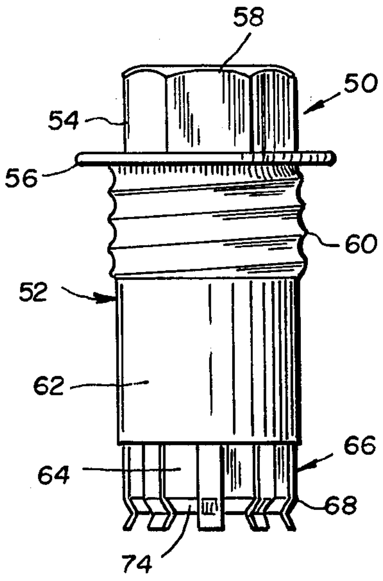
FIG. 5 is an end view in elevation of a protector cartridge having a protective device disposed therein.
Figure 4:
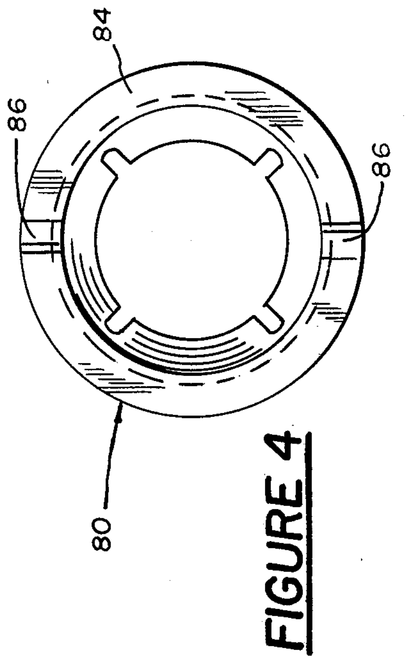
FIG. 4 is a top plan view of a shorting cage showing the retaining means and extending finger portion without a protector cartridge disposed therein.

A protector cartridge 50 is shown in FIG. 5 and is shown in cross-section and in position in protector well or aperture 34, in FIG. 2. The protector cartridge 50 includes an electrically conductive shell 52 which is provided with a cap portion 54 that is hexagonally shaped, and has annular radial flange 56 that is axially spaced from an end wall 58 of the cap 54. The cap 54 further includes a threaded, cylindrically-shaped wall portion 60 and a depending cylindrical skirt portion 62 adjacent to and extending axially from the thread portion 60. The skirt 62 terminates in an open end of the cap portion 54.

Internally disposed within the protector cartridge shell is a protective device 64 which, preferably, is a gas tube manufactured by TII Industries, Incorporated known as Model No. 362 or 364.

The protective device 64 is centrally disposed within a retaining cage 66 which is cylindrically-shaped and provided with a plurality of fingers 68 formed to retain the protective device 64 therewithin. Additonally included in the retaining cage 66, are solder pellets and/or disc 70 specifically chosen to melt with excessive current flowing therethrough because of the excessive heat generated thereby, and a tube end cap clip 72. When the protective device 64 is in position with the solder disc 70 in position, one terminal 74 of the protective device 64 extends beyond the fingers 68 of retaining cage 66 permitting electrically conductive contact with the button or protrusion 42. A coil spring 76 urges the retaining core 66 against 70 and clip 72 which are in intimate contact with the second terminal 78 of protective device 64. Thus, if disc 70 is to melt because of overheating, spring 76 would urge cage 66 into electrical contact with button 42 by pressing fingers 68 thereagainst and would maintain this shorted position until the protector cartridge is removed from the protector well or aperture 34 by a service technician.

Disposed between the protector cartridge 50 and the threaded periphery 36 of link 32 is a shorting cage 80, which is fabricated from an electrically conductive material such as copper, or the like, and is provided with a threaded upper portion 82 terminating and adjacent to a horizontal peripheral flange 84 that is provided with a detent 86 or retaining edge, whose function will be described hereinafter. When in position the shorting cage is in intimate electrical contact with link 32 and shell 52; and, via spring 76, retaining cage 66, and discs 70 and 72, with terminal 78 of protective device 64. Shorting cage 80 is, preferably, provided with a plurality of fingers 88 which extend downwardly and are adjacent to the threaded portion 82. When the shorting cage 80 is inserted into protector well or aperture 40, shown in FIG. 3, without the protective device 6 inserted therein, the fingers 88 flex inwardly until they provide electrically conductive contact with the button 44. The preformed tendency for the fingers 88 to move inwardly is provided by incorporating a plurality of slots 90 in the lower portion of shorting cage 80.

When the protective cartridge 50 is inserted within the hollow shorting cage 80 and threaded therein until the shorting cage seats its flange in electrical contact with link 32 or 38 and the flange 56 of shell 52 is seated and in contact with link 32, the finger portion of shorting cage 80 will be urged outwardly out of electrical contact with button 42 as is shown in FIG. 2.

In operation, the shorting cage 80 will be inserted into protector well 34 or 40 upon removal of the protective cartridge ridge 50 and threaded therein until it becomes seated. Thereafter, protector device 50 will be threaded into the shorting cage 80 until flange 56 seats against the flange 84 on the shorting device until it causes the flexing of detent 86, or alternatively the flange 6 may be pierced on installation to form detent 86. Thereafter, should the protector device 50 be removed because of failure thereof, the shorting cage 80 will be caused to remain in the aperture 34 or 40 by virtue of the detent means retaining the shorting cage therein as the protector device is unscrewed therefrom. If the protective cartridge 50 is not reinserted into the aperture, or if the protective device 64 is not replaced, a short will be caused to occur because the line 26 or 28 and ground, thereby, indicating to the central office that the communication line is inoperative. Thus, there is provided a fail-safe protection for the communication line until an operating protector cartridge is properly inserted in the aperture with a properly operating protector device therein.

Hereinbefore has been disclosed a fail-safe shorting cage which may be utilized in conjunction with protector terminals to prevent terminals from being left without protective devices being inserted therein. It will be understood that various changes in the details, material, arrangement of parts and operating conditions which have been herein described and illustrated in order to explain the nature of the invention may be made by those skilled in the art within the principles and scope of the instant invention.

Having thus set forth the nature of the invention, what is claimed is:

1. An overvoltage surge arrester apparatus for protecting communication lines and equipment connected thereto from voltage surges comprising:

(a) a housing of insulating material having at least one well-type aperture disposed therein, said well-type aperture being provided with a first electrode adapted to be connected to earth ground and disposed at the closed end thereof having an upwardly extending portion and a second electrode disposed about the periphery of the open end of said well-type aperture, said second electrode being adapted to be connected to one of said communication lines;

(b) a hollow, electrically conductive shorting cage adapted to be received into said well-type aperture, said shorting cage being in continuous intimate electrical contact with said second electrode and having at least one inwardly extending finger portion adapted to be in electrically conductive contact with said upwardly extending portion of said first electrode; and (c) a protector cartridge including an electrically conductive shell adapted to be received into said hollow shorting cage and be in electrically conductive contact at the upper portion thereof providing electrically conductive contact with a protective device disposed within said shell, one terminal of said protective device extending downwardly beyond said shell and being adapted to be in electrical contact with said upwardly extending portion of said first electrode when in position in said shorting cage, said protector cartridge shell displacing the inwardly extending finger portion of said shorting cage causing it to be out of electrically conductive contact with said upwardly extending portion of said first electrode when in position in the well-type aperture.

2. An overvoltage surge arrester according to claim 1 wherein said second electrode is provided with a threaded portion and is adapted to receive and cooperate with a threaded portion provided at the upper portion of said shorting cage, and said shorting cage threaded portion is also adapted to receive a threaded portion provided on the shell of said protector cartridge.

3. An overvoltage surge arrester according to claim 1 wherein said shorting cage is provided with a plurality of inwardly extending finger portions.

4. An overvoltage surge arrester according to claim 1 wherein said shorting cage is provided with means for accurately determining its depth within said well-type aperture.

5. An overvoltage surge arrester according to claim 1 wherein said shorting cage includes retaining means for retaining said cage in position in said well-type aperture when said protector cartridge is removed therefrom.

6. An overvoltage surge arrester according to claims 1, 2, 3, 4 or 5 wherein said well-type aperture, said shorting cage and said protector cartridge are cylindrically-shaped.

7. An overvoltage surge arrester apparatus for providing communication lines and equipment connected thereto from voltage surges having a housing of insulating material with at least one well-type aperture disposed therein, said well-type aperture being provided with a first electrode disposed at the closed end thereof having an upwardly extending portion adapted to be connected to earth ground and a second electrode disposed about the periphery of the open end of said well-type aperture, said second electrode being adapted to be connected to one of said communication lines and a protector cartridge including an electrically conductive shell adapter to be received into said well-type aperture and be in electrically conductive contact at the upper portion thereof providing electrically conductive contact with a protective device disposed within said shell, one terminal of said protective device extending downwardly and being adapted to be in electrical conductive contact with said upwardly extending portion of said first electrode when in position in said well-type aperture, the improvement comprising, a hollow, electrically conductive shorting cage adapted to be received into said well-type aperture disposed between said second electrode and said protector cartridge shell, said shorting cage being in continuous intimate electrical contact with said second electrode and having at least one inwardly extending finger portion adapted to be in electrically conductive contact with said upwardly extending portion of said first electrode, said protector cartridge having one terminal of said protective device extending downwardly beyond said shell and being in contact with the upwardly extending portion of said first electrode and displacing said shorting cage finger portion out of contact with said first electrode extending portion when said protector is in position.

8. The overvoltage surge arrester apparatus according to claim 7 wherein said shorting cage is provided with a threaded upper portion adapted to mate and cooperate with threaded portions provided on said second electrode and said protector cartridge shell.

9. An overvoltage surge arrester apparatus according to claim 7 wherein said shorting cage is provided with retaining means for retaining said cage in position in said well-type aperture when said protector cartridge is removed therefrom.

* * * * *